Jan. 2, 1945.  J. G. MEJEAN ET AL  2,366,637
TRANSMISSION SYSTEM
Filed Sept. 24, 1941  2 Sheets-Sheet 1

Inventors
JACQUES GUSTAVE MEJEAN,
RAYMOND HENRI AMAND,
By Robert B. Pearson Attorney

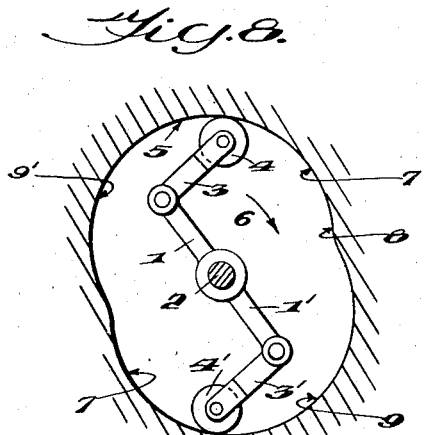
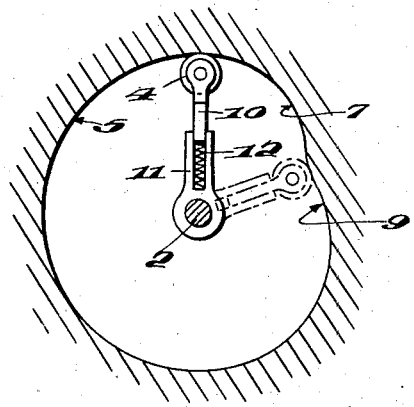
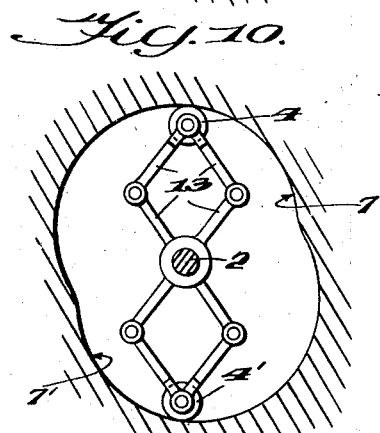
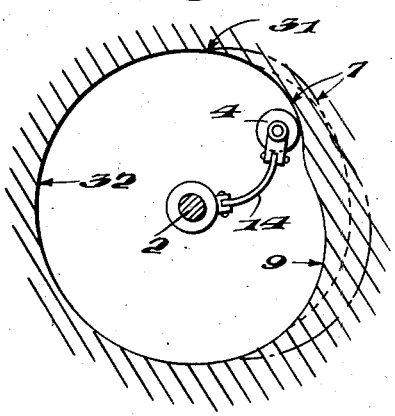
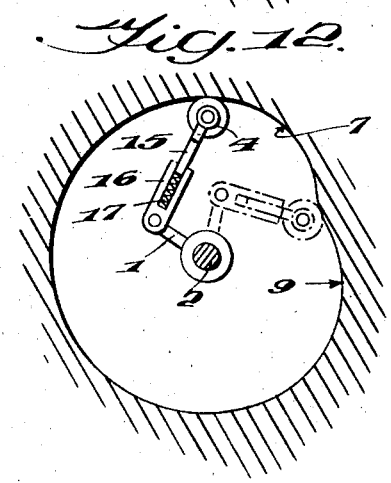
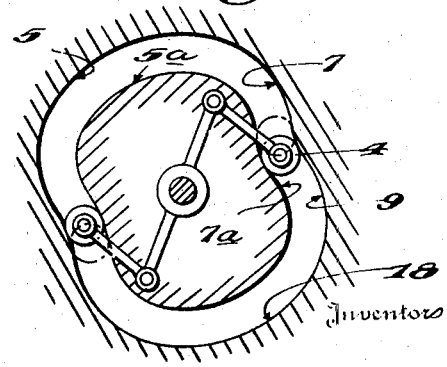

Patented Jan. 2, 1945

2,366,637

UNITED STATES PATENT OFFICE 2,366,637

TRANSMISSION SYSTEM

Jacques Gustave Mejean, Westport, and Raymond Henri Amand, Norwalk, Conn.

Application September 24, 1941, Serial No. 412,198

14 Claims. (Cl. 74—64)

The present invention has for its primary object a system by which movement can be transmitted from a driving member to a driven member and is characterized by the fact that it is constructed of at least one mass driven by one of these members, and by at least one cam attached to the other of these members and against which, when movement is transmitted the mass comes in contact with a certain force, thus creating an action which drives the driven member. The cam, when there is a relative movement between the driven and driving members, deviates the mass in such a way that a reaction is created which has a tendency to drive the driven member, some means being provided so as to enable, in this case, the mass to be submitted later on to a deviation in opposite direction without annulling the driving effect.

The invention together with its objectives and advantages will be best understood from a study of the following description taken in connection with the accompanying drawings in which:

Figure 8 is a schematic representation showing one embodiment of this invention.

Figure 9 is a schematic representation showing a modification of this invention.

Figure 10 is a schematic representation showing a further modification of this invention.

Figure 11 is a schematic representation showing a further modification of this invention.

Figure 12 is a schematic representation showing a further modification of this invention.

Figure 13 is a schematic representation showing a still further modification of this invention.

To describe how the mechanism works, we shall consider the various efforts in action in the system.

Figure 1:
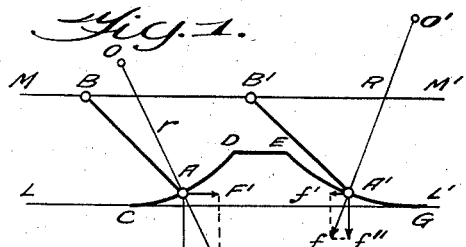
Figure 1 is a diagrammatic representation of the theory of the operation of this invention.

Let us consider (Fig. 1) a roller having a mass $m$, which has been shown on the drawings, for simplification, as being a point A, fixed at the end of a rod AB of which the extremity B moves along a line MM' with a constant speed V.

Point A follows a profile C, D, E, G comprising two fractions of circumference CD and EG, both tangent to a line LL' parallel to MM'. Part DE of this profile is also parallel to LL'. The arc CD has a center O and a radius $r$, and the arc EG has a center O' and a radius R. Furthermore, we shall suppose that MM' and LL' are set in a horizontal plane so that it is not necessary to take into consideration the action of gravity.

When point A moves on the arc CD, that point has at each moment an angular speed $\omega$ around the center O. To this angular speed corresponds a centrifugal force $$F = m\omega^2 r$$

This force is directed according to the radius OA and can be broken down into two forces F' and F''. The first, F' has a tendency to drive the profile CD parallelly to LL' toward the right hand side of Fig. 1. Force F'' has a tendency of applying the profile CD on the base LL'.

When point A reaches point D, its action on the profile will cease and will only take place again from point E to the point G.

Let us suppose that point A has reached point A'; B is then at B', and point A at that moment has an angular speed $\omega'$ around O' and to this angular speed corresponds a force $f$ such as:

$$f = m\omega'^2 R$$

This force is directed according to radius OA and can be broken down into two forces $f'$ and $f''$. The force $f'$ has a tendency to drive the profile EG parallelly to LL' but towards the left hand side of Fig. 1; $f''$ has a tendency to apply the profile on the base LL'.

Taking a particular case (Fig. 2) we shall show the relative effects of the forces F and $f$ and of their components F' and $f'$.

Let us suppose that $R=2r$ and that the arc $CD=90°$. The angle GO'E is such that $$r=2r \cdot \cos \alpha$$

that is to say, $\cos \alpha = \frac{1}{2}$ and $\alpha=60°$.

The length EP (Fig. 2) is then equal to $2r \sin \alpha = 1.72r$.

To obtain the average angular speeds corresponding to the travels along the arcs CD and EG, we can take for unit of time the travel made by point B as we have supposed the speed of this point to be constant. Supposing B moves on a parallel line to LL', passing through point O, and that the length $BA=2r$, the angle B'CO is then equal to $\alpha$. It is then easy to show that during the travel on arc CD, point A and the rod turn 90° during the time proportional to $1.72r$, and that during the travel on arc EG, point A and the rod turn 60° during the time proportional to $2r$. The angular speeds of A along CD and along EG are therefore proportional to 125 and 30.

If we admit that the angular speed of point A is constant during the travel on the aforesaid parts, the forces F and $f$ have for a value:

$$F=m.125^2.r=15625.mr$$
$$f=m.30^2.2r=1800.mr$$

At point D and E, the values of F' and $f'$ are:

$$F'=F=15625\ mr$$
$$f'=f \cdot \sin 60°=1550\ mr$$

Of what precedes it results that the effort $f'$, which has a tendency to drive the profile toward the left can easily be about $\frac{1}{10}$ of the effort F' which has a tendency to drive this same profile toward the right hand side of the figure. It is possible to trace a diagram representing the variations of F' and $f'$ in connection with the displacements of point B.

Figure 3:
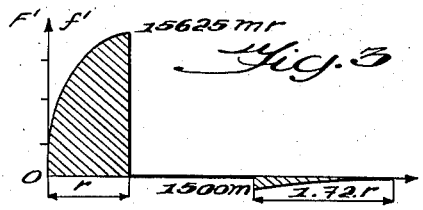
Figure 3 is a graphical representation of the displacement of point B when point A coincides with point C, plotted against values of F' and $f'$.

On Fig. 3 we have plotted the displacements of B, taking for origin the point corresponding to a position of B for which A coincides with C, against the values of F' (positives) and of $f'$ (negatives).

If we admit that the profile CDEG moves and produces some work under the effects of the forces due to point A, we see that the positive work and the negative work are represented by the shadowed surfaces on Fig. 3.

To simplify, we neglect the negative work and we shall take the value of the average force corresponding to the variable force F'. Let us call $\Phi$ this average force. An easy calculation shows:

$$\Phi = \frac{2m\omega^2 r}{\pi}$$

This is the effort that we shall suppose acts constantly on the profile CD during all the time point A is in contact with this profile. Point A travels on profile CD during the length of time $t$ which has for a value:

$$t=\frac{r(2 \sin \alpha - 1)}{V}$$

The space travelled by the profile CD (with a speed $v$) during this time will be $$e=v.t.=\frac{v}{V} \cdot 4(2 \sin \alpha - 1)$$

During the other part of the travel we set aside the length DE and as we neglect the resisting work corresponding to the displacement of point A along EG we have a displacement of B equal to $2r$ when A goes from E to G. This displacement takes place during the time $$t'=\frac{2r}{V}$$

The profile moves during this time a distance $$e'=\frac{v}{V} \cdot 2r$$

Let us design by $\varphi$ a force which acting on the profile during all the time of the displacement of A along CD and EG, produces a work equal to the work produced by the force $\Phi$ when A travels along the arc CD. The displacement of the profile when A has completely traveled over it is calculated in the following way:

The displacement of B, if we suppose the length DE null, has for a value $r.(2 \sin \alpha + 1)$. The corresponding length of time is:

$$t''=\frac{r(2 \sin \alpha + 1)}{V}$$

To this length of time corresponds a displacement of the profile $$e''=\frac{v}{V} \cdot r(2 \sin \alpha + 1)$$

If we write that $$\varphi.e = \Phi.e''$$

we obtain $$\Phi = \varphi \cdot \frac{2 \sin \alpha - 1}{2 \sin \alpha + 1}$$

But we know that $$\varphi = \frac{2m\omega^2 r}{\pi} \text{ and } \omega = K.(V-v)$$

if we design by K a constant.
Consequently, $$\Phi = \frac{2K^2 mr}{\pi} \cdot \frac{2 \sin \alpha - 1}{2 \sin \alpha + 1} \cdot (V-v)^2 = K'.(V-v)^2$$

and the corresponding work is $$T=K''.(V-v)^2.v$$

This expression enables, by giving to V a value $a$, to trace the curve representing the variation of T against $v$.

Figure 4:
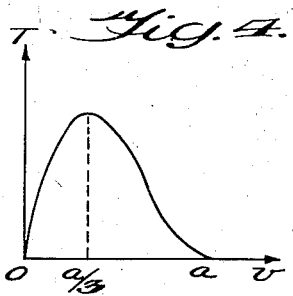
Figure 4 is a graphical representation of the variation of the power derived by plotting the work T against the velocity $v$.

Fig. 4 represents this curve.

This curve cuts the abscissa at its origin. It has a maximum for a value equal to $$\frac{a}{3}$$

and has a minimum coinciding with a double root for a value $v=a$.

Figure 5:
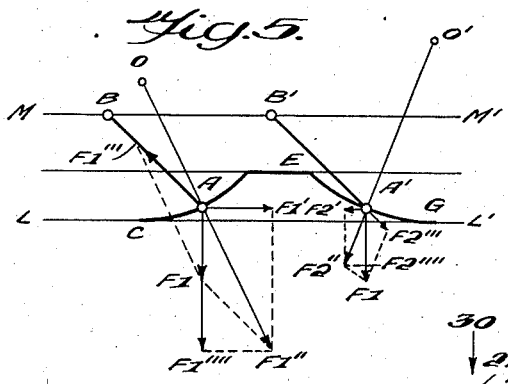
Figure 5 is a diagrammatic representation of the theory of operation of this invention except that the mass $m$ has been omitted and the point A subjected to a constant force $F_1$ which is perpendicular to the line LL' wherein the force $F_1$ is broken down into its component forces.

We shall now neglect the mass $m$ of the roller represented by point A (Fig. 5) and we shall suppose point A is submitted to a constant effort $F_1$ constant in intensity and direction and perpendicular to LL'.

This force $F_1$ can be broken up in a force $F''_1$ according to the normal at point A to the profile CD and in another force $F'''_1$ according to A.B.

The force $F''_1$ gives on the one hand a composite $F'_1$ which tends to displace the profile towards the right hand side parallelly to LL', and on the other hand a composite $F''''_1$, which has a tendency to apply the profile on the base LL'.

An analogous reasoning can be made when the point A reaches A' on profile EG, but in this case the component $F'_2$, parallel to LL', is always much smaller than $F'_1$ for the two following reasons:

(1) Because A' is on the arc EG and that O'A' always makes a big angle with LL';

(2) Because the angle of the rod is towards the back compared with the direction of movement.

If we consider a force $\Phi_1$ which will be the average force resulting in the integration of the force $F'_1$ along the arc CD, we see that $F'_1$ and therefore $\Phi_1$ are exactly proportional to F. If in particular V is the speed of B, and if $F_1$ is proportional to $V^2$ we have:

$$F_1 = Kv^2 \quad F'_1 = K'v^2 \quad \Phi_1 = K''v^2$$

Figure 2:
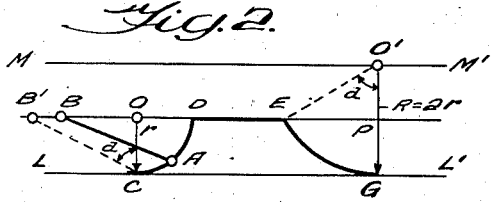
Figure 2 is a force diagram showing the relative effects of the operating forces F, $f$, F', $f'$, of Figure 1.

If we admit the setup corresponding to that shown on Fig. 2, A travels along the profile CD during the time equal to $t$ having the value $$t = \frac{r(2 \sin. \alpha - 1)}{V}$$

The space traveled by the profile has for a value $$e = v.t = \frac{v}{V} \cdot r.(2 \sin. \alpha - 1)$$

During the other portion of the travel there is no work done and if we do not take into consideration the portion DE, we have for the displacement of B the value $2r$. The corresponding time is $$t = \frac{2r}{V}$$

The space traveled by the profile is then $$e' = v.t' = \frac{v}{V} \cdot 2r$$

If we chose a force $\varphi_1$, which, acting constantly, produces the same work that $\Phi_1$ during the travel $e$, we have $$\psi_1 = \phi_1 \cdot \frac{v}{V} \cdot \frac{2 \sin. \alpha - 1}{2 \sin. \alpha + 1} = K'''.V.v$$

This force gives a work $$T_1 = K'''.V.v^2$$

For a given value of V, this curve is a parabola having for equation $T_1 = Kv^2$ If we superpose (Fig. 6) a curve of the third degree $(p)$ represented by the equation $$T = K''.(V-v)^2.v$$

as derived above, and the parabola $(q)$ represented by the equation $V_1 = kv^2$ also derived above, we obtain a resulting curve $(s)$. This curve shows that if we design by $a$ the value of the nominal speed of the driven member, we obtain between 0 and $$\frac{a}{3}$$

a rapid increase of the transmitted power but that between $$\frac{a}{3}$$

and $a$, transmitted power stays comprised between two limits not far apart.

It is to be remembered that it is possible to change the forms of the curves $p$ and $q$. The radius $r$ of the profile does not enter into the calculation of the curve $q$ and therefore this curve is subject to only the mass $m$ and to the speed V of the driving member.

Figure 6:
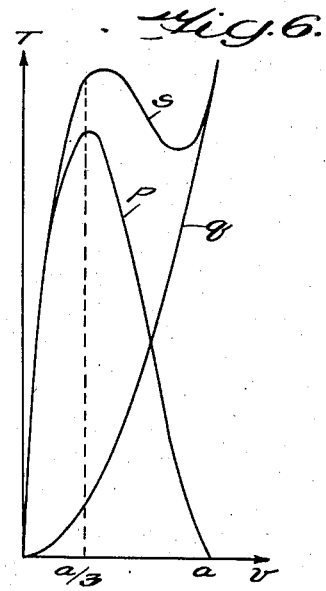
Figure 6 is a graphical representation of the transmitted power curve derived from the superimposition of the power curve $p$ taken from Figure 4 and the power curve $q$ derived similarly from Figure 5.
Figure 7:
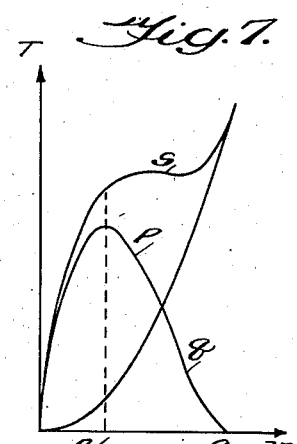
Figure 7 is a graphical representation of the transmitted power curve wherein the curve is shown as dependent upon the effective values of the curves $p$, $q$, of Figure 6.

Fig. 7 shows two other curves $pq$ giving a resulting curve $a$ different than the one shown on Fig. 6 for speeds between $$\frac{a}{3}$$

and $a$.

Therefore it can be understood that by a system such as the one just described it is possible to move along a line a driven part having a resistance R, and this at different speeds and though A is linked to a system of which one point, B, has a constant speed. This system is advantageous because of the fact that the starting torque is important.

The demonstration which has just been made supposes linear displacements but could, of course, be made in the case in which B moves in a circle. It then would be necessary to roll the line LL' into a circle concentric to the circle previously mentioned.

Figs. 8 to 14 represent schematically and only as an example, seven ways of performing the operation which is the object of the present invention.

In the case of Fig. 8 the system comprises two cranks I and I', diametrically opposed and linked to a driving axis number 2. At the extremity of each of these cranks is a connecting rod 3 and 3', having rollers 4 and 4' which will be applied under the effect of centrifugal force due to the rotation of the axis 2 against the inside of a chamber 5 linked to the driven member and capable of turning around an axis which is not represented but which is co-axial with the shaft 2.

In what follows we shall only consider the case of the roller 4 as everything is exactly the same concerning the roller 4'. The shaft 2 turns at a constant speed in the direction of the arrow 6. The roller 4 being in the position represented, begins to climb without clashing on the part 7 of the profile 5 which constitutes a cam which forces this roller 4 to leave its circular trajectory and to come nearer to the axis of rotation. Due to this deviation, the part 7 of the cam is submitted to a reaction corresponding to the case studied in the first paragraph and which has a tendency to drive this cam in the direction of the arrow 6. If we suppose that the driving member turns at its nominal speed and that the driven member is not rotating, we see that when the roller 4 drives along the cam 7 the driven member has a tendency to follow the driving member with a force depending upon the curvature of cam 7. When the roller 4 attains the summit 8 of the cam, the driving action due to the aforesaid reaction is finished and the roller 4 deviates in the opposite direction so as to come back to the same radius as at the beginning after having traveled on the cam 9, which preferably will be longer and of greater curvature than cam 7.

Theoretically we could assume that after point 8 the radius suddenly returns to its original value. In this case there would be no negative influence due to the deviation along cam 9, but there would be a clashing due to the fact that the roller would meet profile 5 with a given speed due to the centrifugal force.

Due to the repeated effects of the roller 4 on the cam 7, the driven member builds up speed and there comes a moment when the relative speed of the roller 4 in connection with the cam 7 has a tendency to become null. At the moment when this synchronizing is obtained, the roller is immobile somewhere along the cam 7 and the driving action takes place only under the action due to the action of the centrifugal force which has been studied before in the second paragraph.

As we have said, this action is independent of the curvature of the cam and this is evident because at that moment the roller 4 is immobile on this cam and is not submitted to any deviation due to this cam. It is clear that the cams 7' and 9' are identical to the cams 7 and 9 and that all that has been described concerning the roller 4 is true concerning the roller 4'.

The symmetrical arrangement according to Fig. 8 is advantageous for systems wherein balance is essential. It is clear that it would be possible to multiply the number of rollers and the number of cams. In the case of Fig. 8, rod 3 pushes the roller 4. It is, in fact, more advantageous to push the roller than to pull it.

In the case of Fig. 9, the roller 4 is mounted on a straight arm 10 which can move radially in another arm 11 mounted on a shaft 2. A spring 12 which is not absolutely indispensible drives the roller 4 towards profile 5 even when the shaft 2 doesn't turn. The working conditions of this system are about the same as in the case described before. It is clear that as long as the driven member turns at an inferior speed to that of the driving member, the roller 4 is deviated when travelling on the cam 7, this deviation producing a reaction having a tendency to drive the driven member and depending on the curve of cam 7. During the negative deviation along the cam 9, the negative effect is very small and practically negligible in comparison with the positive effort exerted on the cam 7.

According to Fig. 10 the mounting is analogous to that of Fig. 9 and is only different by the fact that the roller 4 is connected to the shaft 2 by an articulated lozenge 13. In this case roller 4' is set symmetrically to roller 4. As in the first case there are two cams 7 and 7' in order to drive the driven member.

In the case of Fig. 11 the roller 4 is linked to a shaft 2 by means of an elastic arm 14 which gives away of a given quantity when the roller 4 is working against cam 7 and restoring this energy as soon as roller 4 leaves cam 7 and follows cam 9. This elastic connection has the advantage of appreciably diminishing the importance of the retarding effect due to the deviation of roller 4 along cam 9.

Fig. 12 shows another example in which roller 4 is linked to a crank 1 by means of a connecting rod of variable length comprising a part 15 sliding in a tubular part 16. A spring 17 inside this part 16 continually drives the roller 4 as far as possible from the articulation point of the connecting rod on the crank. The operation of this device is absolutely analogous to that of Fig. 8 but this setup has the advantage which has been mentioned already in connection with Fig. 11, that is, that the energy built up by the spring 17 when it is giving away during the travel of roller 4 on cam 7, is restored during the travel on cam 9 and enables the obtaining of a small negative effect.

In the example shown in Fig. 13, the driven member is connected to a profile 5 as is the case in Fig. 8. This driven member is also connected to another profile 5a. The two profiles 5 and 5a constitute a sort of slide for roller 4. The cam 7 has the same effect as in the preceding systems. When roller 4 leaves cam 7 and attains a position shown in full line it meets a cam 7a belonging to the profile 5a, this cam having such a shape that the roller is diverted from the trajectory that it would take if the part following cam 7 (cam 9) did not assist, that is to say, if profile 5 varied suddenly from the minimum radius to the maximum radius. Cam 7a is submitted because of deviation from the roller 4 to a reaction having the tendency to drive the driven member.

In this way roller 4 produces a driving effect not only during its deviation along cam 7, but also during its other deviation which instead of taking place freely under the effect of the centrifugal force as in the preceding examples, takes place in this case under a compelled effect due to the action of cam 7a. When the roller 4 ceases being submitted to the action of cam 7a it is applied by the centrifugal force against part 18 of minimum radius of the profile 5. In all the aforesaid examples we have dealt with a roller turning in a plane which is perpendicular to the axis of rotation of the driving and driven shafts.

Figure 14:
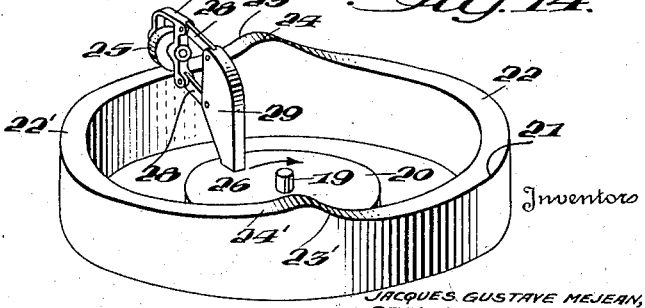
Figure 14 is a perspective view of a further modification of the invention.

Fig. 14 shows another example in which the roller turns around an axis parallel to the principal component of the deviation to which the cam submits the roller when there is a relative motion between the driving and driven members.

In fact, the driving shaft 19 is fixed to a plate 20 which is concentric to a part 21 which has an annular section concentric to the driving shaft and fixed to a driven member which is not shown. The section of part 21 has a part 22 and 22' which are in a perpendicular plane to the shaft 19, and two cams 23 and 23' which have the same object as the cams 7 in the aforesaid examples. A cam 24, 24' follows the cam 23, 23' and has the same effect as the cam 9 in the aforesaid examples. A roller 25 rolls on parts 22, 23, and 24 when the driving shaft 19 turns in the direction indicated by arrow 26. The axis of this roller is supported by a part 27 linked to an articulated parallelogram 28 to a part 29, fixed on the plate 20. Some means, which are not shown, act vertically on part 27 so as to constantly apply the roller with a given force upon the arrow 30 against the section of part 21. When there is a relative movement between the driven and driving members, that is to say when the driven member turns slower than the driving member, the roller 25 is diverted on its trajectory when it begins to climb on cam 23. This deviation produces a reaction on this cam which has a tendency to drive part 21. Once having traveled on cam 23, the roller travels along cam 24 under the effect of the force 30. In this case as in the above examples, the negative deviation of roller 25 as it comes back to its original position on part 22 gives a negative effect which is smaller than the positive effect. When both the driving and driven shafts turn at the same speed, the roller takes a balanced position somewhere along cam 23 and then the driving effect takes place only because of the action due to force 30. This force can be obtained by the centrifugal effect of a mass turning with shaft 19 and acting on part 27 by means of a lever. This force also can be constant. It could also vary according to the relative position of the roller with part 21 according to any predetermined law, for instance by means of a cam which would turn at the same time as part 21 and which would act on part 27 by means of a spring. It would therefore be possible to obtain a force 30 which would be maximum when the roller is in contact with cam 23, and minimum when it is on cam 24.

The profile 9 in the aforesaid examples has been made in order to obtain without clashing the return of the roller 4 in its far off position from the axis of rotation. This profile can, of course, be established in such a way that at nominal speed the pressure of the roller on this cam 9 may be as small as it is desirable.

In some cases it may be advantageous that cam 7 be controlled in such a way as to come progressively into position in order to work against roller 4. Fig. 11 schematically shows this sort of an arrangement. In this case the part comprising the cam 7 and 9 is constituted by the part turning around a parallel axis to the shaft 2 situated at point 31 at the beginning of cam 7. Means are provided, which have not been shown, in order to remove completely cam 7 outside the circular profile 32 so that the roller is not submitted to any deviation during its rotation. These same means enable progressively driving cam 7 into contact with the roller. Such a disposition enables the starting of the driven shaft 2 and the building up of its speed to the nominal speed without the roller 4 encountering any resistance against cam 7 once the nominal speed of the driving shaft is obtained. This sort of device is interesting when this system is to be utilized as a starter, or as a clutch. Of course an arrangement could be made, in the case of Figs. 8, 9, and 10 in order that it is not the cam 7 which would be gradually put into position of working with the roller but that it would be the roller which would be gradually released in order to work against the cam 7. These means would force the roller 4 to stay on a smaller diameter than the diameter of Fig. 8 as long as there must be no cooperation between the roller and the cam 7. These means would enable a progressive cooperation by gradually increasing the distance between the roller 4 and the axis 2.

What has been said concerning the diagrams shown by Figs. 6 and 7, and about force 30 shows that the radius of the cam on which the roller 4 or 25 acts in order to produce the driving action of the driven member, and the instantaneous value of the force with which this roller is applied on the cam, may be chosen in such a way that when the speed of a driven member increases from zero under the effects of the system the law of variation of the transmitted power from the driving member to the driven member can be made to follow as much as it is desired a predetermined law. In the examples according to Figs. 8 to 13, roller 4 is deviated by the cam or cams 7 from its normally circular trajectory. Of course it would be possible that this trajectory should not be circular, but for instance elliptic or any other shape. This would be useful in case it should be necessary to transmit the movement of a driving member having constant rotational speed to a driven member which must receive a periodically variable speed according to a given law, or vice versa.

We claim:

1. A transmission system balanced statically and dynamically having a driving member and a driven member and comprising, a connecting rod having a mass secured on one end thereof, the other end being secured to and driven by one of said members and a cam connected with the other member and against which the movement of said mass is applied with a certain force, said force exerting an action tending to drive said driven member, said cam having a portion formed to deviate said mass so that it creates a reaction tending to drive said driven member, continuously in the direction of the movement of the driving member when there is a relative movement between said driven and driving members, said cam having a subsequent portion disposed to cause said mass to take a negative deviation without nullifying the driving effect, said connecting rod and said mass being disposed forwardly with respect to the angle of rotation, and said first said cam portion having a greater curvature than said subsequent portion.

2. A system according to claim 1 characterized by the fact that the aforesaid reaction is a function of the curvatures of said cam.

3. A system according to claim 1 characterized by the fact that said force assisting the aforesaid action is independent of the curvatures of said cam.

4. A transmission system balanced statically and dynamically having a driving member and a driven member and comprising, a connecting rod having a mass secured on one end thereof, the other end being secured to and driven by one of said members and a cam linked to the other member and against which the movement of this mass is applied with a certain force, said force exerting an action tending to drive the driven member, continuously, in the direction of the movement of the driving member, said cam having a portion formed to deviate said mass so that it creates a reaction tending to drive the driven member when there is a relative movement between the driven and driving members, said cam having a subsequent portion disposed to cause the mass to take a negative deviation without nullifying the driving effect, said connecting rod and said mass being disposed forwardly with respect to the angle of rotation, and said first said cam portion having a greater curvature than said subsequent portion, said reaction being a function of the curvature of the cam and said force assisting the aforesaid action being independent of the curvature of the cam.

5. A system according to claim 1 characterized by the fact that the said mass rolls on said cam.

6. A system according to claim 1 characterized by the fact that the surface of said cam is controlled in such a manner as to permit changes in the contour thereof as it comes into cooperation with said mass.

7. A system according to claim 1 characterized by the fact that the said mass rotates in a given plane and the said cam is substantially cylindrical.

8. A system according to claim 1 characterized by the fact that said mass rotates about an axis parallel to the principal component of the deviation of said mass caused by said cam when there is relative movement between the driven and driving members.

9. A system according to claim 1, said driving member comprising a shaft having a crank rigidly secured thereto, said connecting rod having one of its ends pivotally connected to said crank and said mass being rotatably secured to the other of said ends.

10. A transmission system balanced statically and dynamically having a driving member and a driven member and comprising, a mass driven by one of said members and a cam linked to the other member and against which the movement of this mass is applied with a certain force, said force exerting an action tending to drive the driven member, continuously, in the direction of the movement of the driving member, said cam having a portion formed to deviate said mass so that it creates a reaction tending to drive the driven member when there is a relative movement between the driven and driving members, said cam having a subsequent portion disposed to cause the mass to take a negative deviation without nullifying the driving effect, said driving member comprising a shaft having a crank rigidly secured thereto, and a connecting rod, said connecting rod having one of its ends pivotally connected to said crank and said mass being rotatably secured to the other of said ends, said connecting rod pushing said mass against said cam when movement is transmitted.

11. A system according to claim 1 characterized by the fact that it comprises several masses balanced upon a shaft upon which they rotate and having several cams corresponding to the number of said masses.

12. A system according to claim 1 characterized by the fact that it includes a second cam in the plane of the first said cam, said second cam deviating said mass in a direction opposite to the motion of the deviation produced by the first cam, said second cam being so disposed that said second deviation also produces a reaction tending to drive the driven member continuously, in the direction of the movement of said driving member.

13. A system according to claim 1 characterized by the fact that it comprises several masses connected to and symmetrically arranged about the driving means.

14. A transmission system of the type described comprising a drive shaft, an annular member concentrically mounted on and rigidly secured to said drive shaft, an arm member rigidly secured to said annular member and extending substantially at right angles therefrom, a roller, an articulated parallelogram linkage means securing said roller to said arm member, a cam, and means whereby said roller is forced into cooperative engagement with said cam.

JACQUES GUSTAVE MEJEAN.
RAYMOND HENRI AMAND.